(12) United States Patent
Pellegrin et al.

(10) Patent No.: US 11,924,470 B2
(45) Date of Patent: Mar. 5, 2024

(54) ENCODER AND METHOD OF ENCODING A SEQUENCE OF FRAMES

(71) Applicant: INTOPIX SA, Mont-Saint-Guibert (BE)

(72) Inventors: Pascal Pellegrin, Mont-Saint-Guibert (BE); Guillaume Demaude, Forest (BE); Gael Rouvroy, Mont-Saint-Guibert (BE); Charles Buysschaert, Mont-Saint-Guibert (BE)

(73) Assignee: INTOPIX SA, Mont-Saint-Guibert (BE)

( * ) Notice: Subject to any disclaimer, the term of this patent is extended or adjusted under 35 U.S.C. 154(b) by 0 days.

(21) Appl. No.: 17/618,175

(22) PCT Filed: Jun. 12, 2020

(86) PCT No.: PCT/EP2020/066389
§ 371 (c)(1),
(2) Date: Dec. 10, 2021

(87) PCT Pub. No.: WO2020/249790
PCT Pub. Date: Dec. 17, 2020

(65) Prior Publication Data
US 2022/0248057 A1 Aug. 4, 2022

(30) Foreign Application Priority Data
Jun. 12, 2019 (EP) .................................... 19179802

(51) Int. Cl.
*H04N 19/63* (2014.01)
*H04N 19/124* (2014.01)
*H04N 19/159* (2014.01)
*H04N 19/423* (2014.01)
(Continued)

(52) U.S. Cl.
CPC ........... *H04N 19/63* (2014.11); *H04N 19/124* (2014.11); *H04N 19/159* (2014.11);
(Continued)

(58) Field of Classification Search
CPC .. H04N 19/124; H04N 19/159; H04N 19/423; H04N 19/48; H04N 19/503;
(Continued)

(56) References Cited

U.S. PATENT DOCUMENTS 5,585,852 A * 12/1996 Agarwal ................ H04N 19/42
386/E9.013
9,332,258 B2 5/2016 Pellegrin et al.
(Continued)

FOREIGN PATENT DOCUMENTS

EP 0739137 A2 10/1996
WO 2018114813 A1 6/2018

OTHER PUBLICATIONS

Are Nor et al: "Wavelet-baed video compression: A glimpse of the future?", Jan. 1, 2004, URL: https://uia.brage.unit.no/uia-xmlui/bitstream/handle/11250/137220/master_ikt_2004_nor.pdf?sequence=1&isAllowed=y.

(Continued)

*Primary Examiner* — Mohammed S Rahaman
(74) *Attorney, Agent, or Firm* — KARCESKI IP LAW, PLLC

(57) ABSTRACT

In encoding a sequence of frames, a linear transform, such as, for example a wavelet transform, is applied to the sequences of frames on a frame-by-frame basis. At least one portion of a linearly transformed frame thus obtained is encoded in the inter mode on the basis of a differential representation of the linearly transformed frame. The differential representation corresponds with a difference between, on the one hand, the portion of the linearly transformed frame and, on the other hand, a representation of a corresponding portion of at least one other linearly transformed frame. Data compression is then applied to the differential representation of the portion of the linearly transformed frame.

13 Claims, 5 Drawing Sheets

(51) Int. Cl.
*H04N 19/503* (2014.01)
*H04N 19/593* (2014.01)
*H04N 19/91* (2014.01)

(52) U.S. Cl.
CPC ......... *H04N 19/423* (2014.11); *H04N 19/503* (2014.11); *H04N 19/593* (2014.11); *H04N 19/91* (2014.11)

(58) Field of Classification Search
CPC ...... H04N 19/51; H04N 19/593; H04N 19/63; H04N 19/647; H04N 19/91
See application file for complete search history.

(56) References Cited

U.S. PATENT DOCUMENTS

| | | | |
|---|---|---|---|
| 2012/0014455 A1* | 1/2012 | Joshi ...................... | H04N 19/61 375/240.18 |
| 2013/0028528 A1 | 1/2013 | Arai | |
| 2014/0247999 A1* | 9/2014 | Pellegrin .............. | H04N 19/635 382/232 |
| 2017/0163988 A1* | 6/2017 | Lu ........................ | H04N 19/159 |

OTHER PUBLICATIONS

International Preliminary Report on Patentability dated May 21, 2021, for International Patent Application No. PCT/EP2020/066389.
International Search Report dated Jul. 16, 2020, for International Patent Application No. PCT/EP2020/066389.

* cited by examiner

ENCODER AND METHOD OF ENCODING A SEQUENCE OF FRAMES

CROSS-REFERENCE TO RELATED APPLICATION(S)

This is a National Stage Entry into the United States Patent and Trademark Office from International Patent Application No. PCT/EP2020/066389, filed on Jun. 12, 2020, which relies on and claims priority to European Patent Application No. 19179802.4, filed on Jun. 12, 2019, the entire content of both of which are incorporated herein by reference.

FIELD OF THE INVENTION

An aspect of the invention relates to an encoder adapted to encode a sequence of frames. The encoder may be used, for example, to encode a video stream for efficient transmission or storage, or both. Further aspects of the invention relate to a method of encoding a sequence of frames, a computer program for an encoder, a decoder, and a method of decoding an encoded sequence of frames.

BACKGROUND OF THE INVENTION

U.S. Pat. No. 9,332,258 mentions that compression of a digital image is typically achieved in 3 steps: de-correlative transform, entropy coding and rate allocation. A de-correlative transform reduces entropy: a transformed image may have lower entropy because probabilities of occurrence are concentrated on a small subset of coefficient values. De-correlative transforms commonly used in image compression are color transform, inter/intra prediction, DCT or wavelet transforms. Entropy coding reduces the transformed image in data size: a smaller amount of data can represent the transformed image. Finally, rate allocation selects data that will be part of a compressed image output stream to achieve a desired compression ratio.

U.S. Pat. No. 9,332,258 describes a technique for compressing an input data stream into an output data stream having acceptable compression efficiency while minimizing encoder and decoder complexity. A sequence of words of m bits in the input data stream are grouped into groups of n words of m bits, n being greater than or equal to 2. For each group, a value of a Greatest Coded Line Index (GCLI) is detected. The GCLI is the index of the highest weight non-zero bit among the bits, excluding any sign bit, of the words in the group. The output data stream then comprises a group of n words of GCLI bits corresponding to the n words of m bits in the group concerned in the input stream. The GCLI bits of each word are the GCLI bits of lowest weight of the corresponding word in the input stream, and the value of the GCLI.

SUMMARY OF THE INVENTION

There is a need for an improved solution that allows encoding a sequence of frames that better meets at least one of the following criteria: high compression, good image quality, and moderate cost.

In accordance with an aspect of the invention, there is provided an encoder adapted to encode a sequence of frames, the encoder comprising:

a linear transform assembly adapted to apply a linear transform to the sequences of frames on a frame-by-frame basis so as to obtain a sequence of linearly transformed frames having an entropy that is lower than that of the frames in the sequence of frames to be encoded, and an encoding assembly adapted to encode the sequence of linearly transformed frames so as to obtain a sequence of encoded frames comprising an amount of data that is less than that of the linearly transformed frames, wherein the encoding assembly is adapted to encode at least one portion of a linearly transformed frame in an inter mode in which the encoding assembly provides a differential representation of the at least one portion of the linearly transformed frame that is encoded in the inter mode, the differential representation. corresponding with a difference between, on the one hand, the at least one portion of the linearly transformed frame and, on the other hand, a representation of a corresponding at least one portion of at least one other linearly transformed frame, and in which the encoding assembly applies data compression to the differential representation of the at least one portion of the linearly transformed frame so as to obtain at least one portion of an encoded frame.

In accordance with further aspects of the invention, there are provided a method of encoding a sequence of frames, a computer program for an encoder, and a decoder, respectively.

A main difference with conventional encoding schemes is that, in the inter mode, the differential representation of at least a portion of the linearly transformed frame is processed rather than a differential representation of a frame, or a portion thereof, in its original form. This allows implementations of lower complexity in terms of hardware or software, or both, which, in turn, allows low cost and low power consumption implementations. Moreover, applying inter mode encoding allows achieving high compression without significantly compromising image quality.

The fact that a difference between linearly transformed frames is encoded rather than a difference between original frames does, in principle, not adversely affect image quality. This is because a subtraction operation subsequent to a linear transform is equivalent to a subtraction operation prior to the linear transform. Applying an inverse of the linear transform to a differential representation obtained by the subtraction operation subsequent to the linear transform, will yield a differential representation obtained by the subtraction operation prior to the linear transform. Conversely, applying the linear transform to the differential representation obtained by the subtraction operation prior to the linear transform, will yield the differential representation obtained by the subtraction operation subsequent to the linear transform.

It should be noted that, in an encoder as defined hereinbefore, the encoding assembly need not carry out any further transform, which may be de-correlative. Thus, in such an encoder, the linearly transformed frames need not undergo a further transform that may reduce entropy. Rather, data compression that is applied to a differential representation as described hereinbefore may consist in directly applying entropy coding to the differential representation in order to represent the differential representation with less data.

For the purpose of illustration, some embodiments of the invention are described in detail with reference to accompanying drawings. In this description, additional features will be presented, some of which are defined in the dependent claims, and advantages will be apparent.

DESCRIPTION OF SOME EMBODIMENTS

Figure 1:
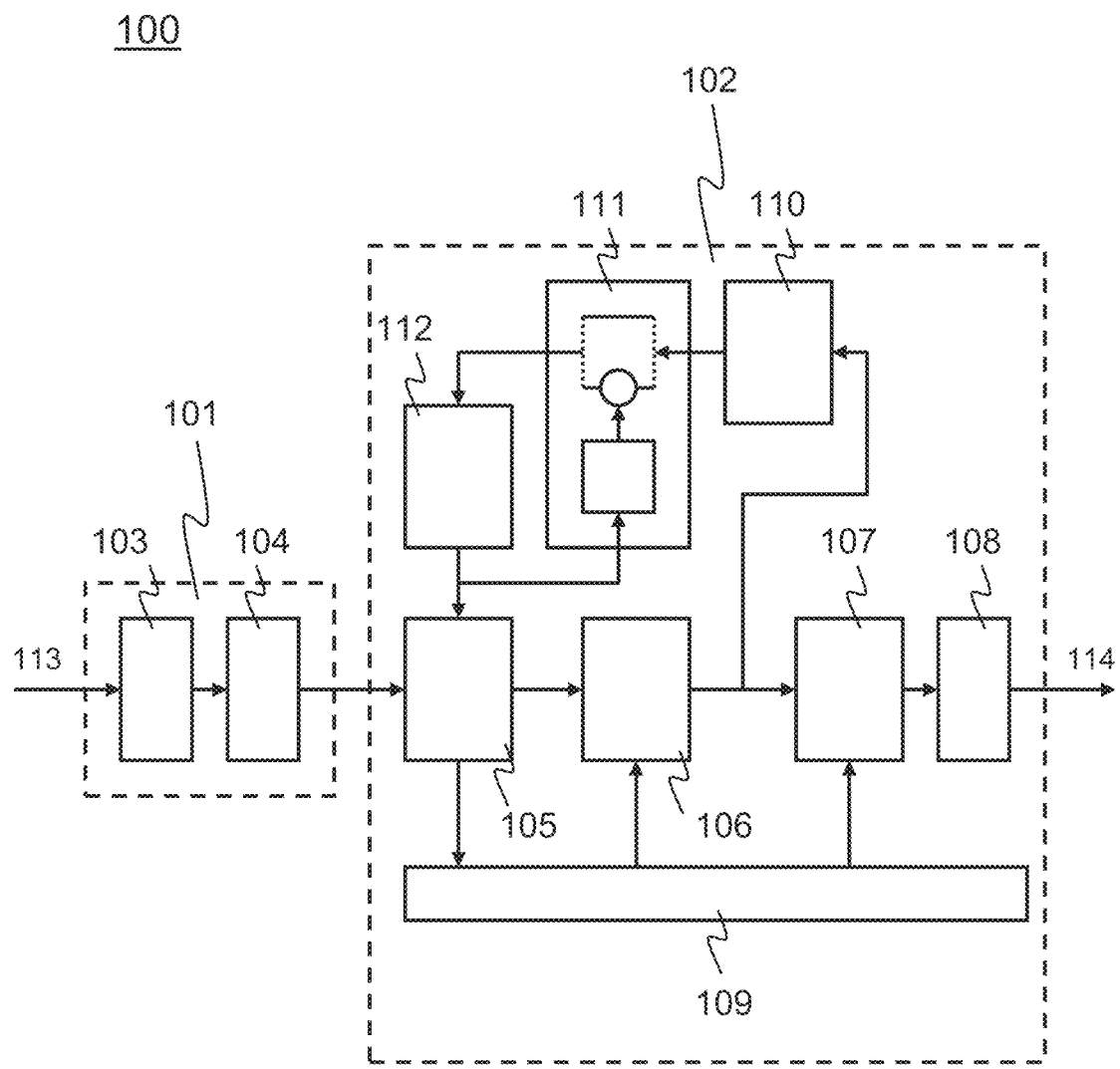
FIG. 1 is a block diagram of a video encoder.

FIG. 1 schematically illustrates a video encoder 100. FIG. 1 provides a block diagram of the video encoder 100. The video encoder 100 may be, for example, comprised in a communication device that can capture a video, or that can store a video, or both, such as, for example, a smart phone. The video encoder 100 may enable the communication device to efficiently transfer a video to another communication device via a communication channel that may be provided by a network.

The video encoder 100 comprises a linear transform assembly 101 and an encoding assembly 102. The linear transform assembly 101 may comprise a reversible color transform module 103 and a wavelet transform module 104. The encoding assembly 102 may comprise an encoding mode selection module 105, a quantization module 106, an entropy coding module 107, a data packaging module 108, a rate allocation module 109, a de-quantization module 110, a reconstruction module 111, and a reference frame buffer assembly 112.

The video encoder 100 basically operates as follows. The video encoder 100 receives a video stream 113, which comprises a sequence of frames. In response, the video encoder 100 outputs an encoded video stream 114, which may have a significantly lower data rate than the video stream 113 received.

A frame in the video stream 113 received may be regarded as a matrix of pixels, which comprises lines of pixels and columns of pixels. A pixel may comprise three components, which, in combination, convey brightness information and color information pertaining to the pixel. The three components are expressed in accordance with a color coordinate system, such as, for example, the color coordinate system referred to as RGB.

The reversible color transform module 103 converts the three components of a pixel into three components of another color coordinate system. Such a reversible color transform may reduce entropy. Accordingly, the reversible color transformation module provides a reversible color transformed frame, which may have less entropy than the frame in its original form. This contributes to image compression.

For the sake of convenience and simplicity, it is assumed that the reversible color transformed frame is a matrix of pixels, whereby the pixels have one component only, such as, for example, a luminance component (Y) only. That is, it is assumed that the reversible color transformed frame is a single matrix of samples representing a single component only whereas, in fact, the reversible color transformed frame may be regarded as a set of three matrices of samples, each of which represents a particular component. For example, the reversible color transformed frame may in fact comprise a matrix of samples representing the luminance (Y) component, another matrix of samples representing a first color component (Cr), and yet another matrix of samples representing a second color component (Cb). These matrices of samples may be processed independently as described hereinafter. A sample may be in the form of a binary word expressing a value of the component concerned.

The wavelet transform module 104 applies a wavelet transform to the reversible color transformed frame. The wavelet transform involves filter and sub-sampling operations. These operations produce a set of respective sub band frames that jointly constitute a linear transformed frame. A sub-band frame represents spectral content of the reversible color transformed frame in a particular spectral band, which is called a sub-band. The wavelet transform that the wavelet transform module 104 carries out may be similar to that in an existing wavelet-based image coding scheme, such as, for example, the image coding scheme known as JPEG-XS.

Figure 2:
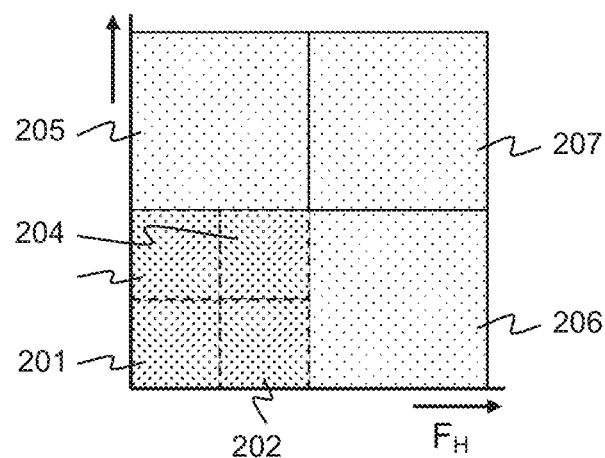
FIG. 2 is a frequency diagram illustrating sub-bands that the video encoder defines.

FIG. 2 conceptually illustrates respective sub-bands 201-207 that the wavelet transform module 104 defines. The respective sub-bands 201-207 are represented in a two-dimensional frequency diagram, which has a horizontal axis representing frequency in horizontal direction $F_H$, and a vertical axis representing frequency in vertical direction $F_V$. The wavelet transform module 104 thus provides respective sub-band frames for these respective sub-bands 201-207. A sub-band frame may be regarded as a matrix of sub-band coefficients. The matrix of sub-band coefficients has a size with respect to the reversible color transformed frame that depends on a sub-sampling factor that the wavelet transform module 104 has applied to obtain the sub-band frame concerned.

Figure 3:
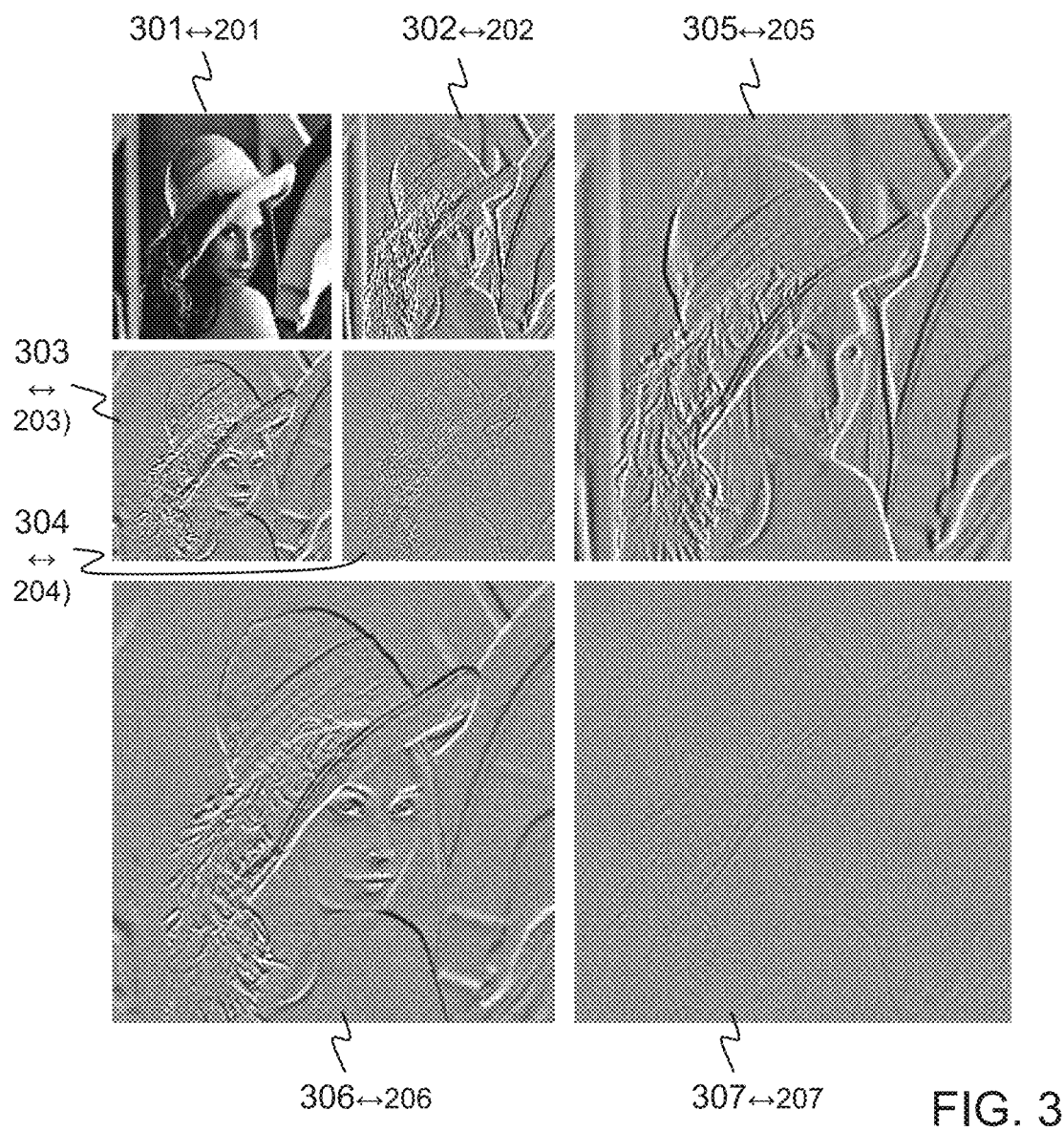
FIG. 3 is a pictorial diagram of a linearly transformed frame produced in the video encoder.

FIG. 3 schematically illustrates respective sub-band frames 301-307 that jointly constitute a linear transformed frame. The respective sub-band frames 301-307 are represented in a pictorial diagram. A sub-band frame is associated with a specific sub-band illustrated in FIG. 2. FIG. 3 indicates the specific sub-band with which a sub-band frame is associated by means of the reference sign associated with this specific sub-band.

The linear transformed frame comprises four relatively small low-frequency sub-band frames 301-304 and three relatively large high-frequency sub-band frames 305-307. For the three high-frequency sub-band frames 305-307, the sub-sampling factor is two. For the four low-frequency sub-band frames 301-304, the sub-sampling factor is four. Among the four low-frequency sub-band frames 301-304, there is a lowest sub-band frame 301, which corresponds with a low pass filtered and downscaled version of the reversible color transformed frame. In this context, downscaling equates with sub-sampling.

A sub-band frame comprises both spectral and spatial information as may be understood from FIG. 3. This property is exploited in the video encoder 100 illustrated in FIG. 1 and described in greater detail. Namely, a certain portion of a sub-band frame can be associated with a similarly located portion in the reversible color transformed frame, as well as in the frame to be encoded.

Referring again to FIG. 1, the encoding assembly 102 may encode the respective sub-band frames 301-307 independently, with the exception of rate allocation and data packaging where compressed sub-band frames are combined. That is, the encoding mode selection module 105, the quantization module 106, the de-quantization module 110, as well as the entropy coding module 107 may sequentially process the respective sub-band frames 301-307 independently. In an alternative embodiment, the encoding assembly 102 may operate according to a parallel processing scheme. In such an embodiment, the encoding assembly 102 may comprise multiple modules of the following type: encoding mode selection, quantization, de-quantization, and entropy coding. Namely, there may be one such module for each sub-band frame comprised in the linearly transformed frame. In the sequel, an encoding of a single sub-band frame is described for the sake of simplicity and convenience. Other sub-band frames are encoded similarly.

In order to encode a sub-band frame, the reference frame buffer assembly 112 comprises a representation of a corresponding sub-band frame related to another frame in the video stream 113 that has previously been encoded. The term corresponding expresses that both aforementioned sub-band frames are associated with a same sub-band. The representation of the corresponding sub-band frame related to frame that has previously been encoded will hereinafter be referred to as corresponding previous sub-band frame for the sake of convenience and conciseness. More generally, in order to encode a linearly transformed frame, the reference frame buffer assembly 112 may comprise a representation of another linearly transformed frame that has previously been encoded. Both the aforementioned linearly transformed frames comprise respective sub-band frames 301-307 as illustrated in FIG. 3.

The encoding assembly 102 may encode a sub-band frame on a portion by portion basis. A portion of a sub-band frame to be encoded may comprise a group of 32 samples on a same line. Depending of the sub-sampling factor, which may be 2 or 4 in this embodiment, such a portion of a sub-band frame may correspond with a block of 64 by 2 samples or a block of 128 by 4 samples, respectively, in the frame to be encoded. A portion of the sub-band frame to be encoded will hereinafter be referred to as sub-band frame portion for the sake of convenience and conciseness.

In order to encode a sub-band frame portion, the encoding mode selection module 105 retrieves from the reference frame buffer assembly 112 a corresponding portion in the corresponding previous sub-band frame. In this embodiment, the corresponding portion has a position in the corresponding previous sub-band frame that is similar to that of the sub-band frame portion to be encoded. The corresponding portion in the corresponding previous sub-band frame will hereinafter be referred to as corresponding previous sub-band frame portion for the sake of convenience and conciseness.

Figure 4:
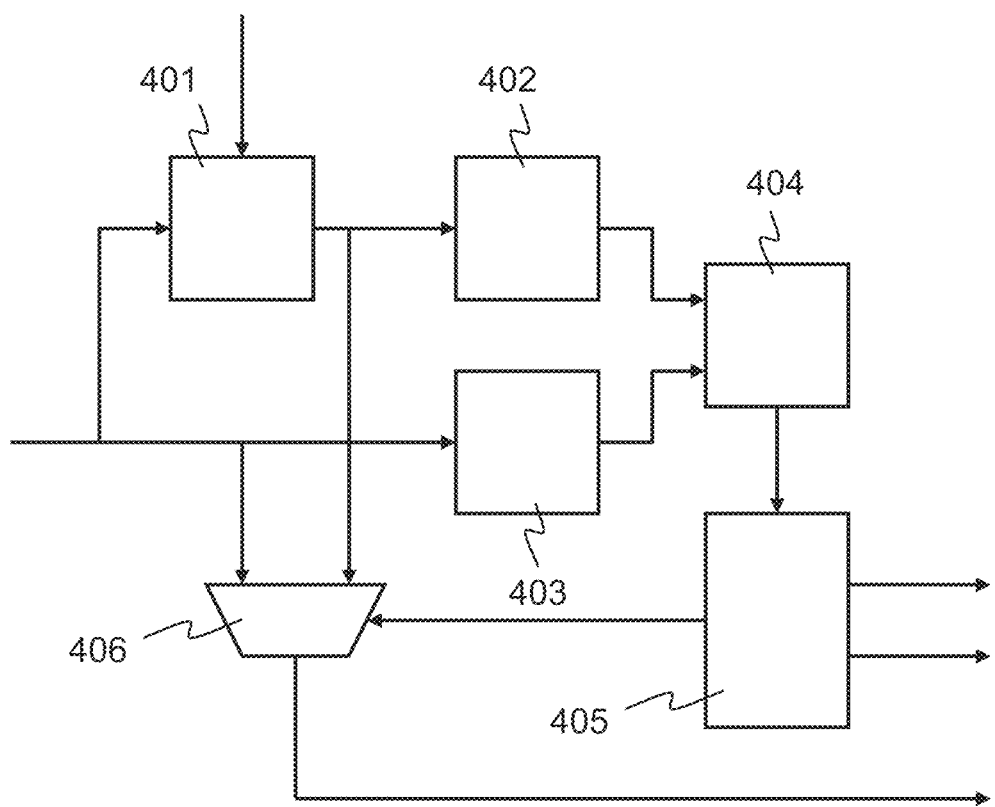
FIG. 4 is a block diagram of an encoding mode selection module in the video encoder.

FIG. 4 schematically illustrates the encoding mode selection module 105 in more detail. FIG. 4 provides a block diagram of the encoding mode selection module 105. The encoding mode selection module 105 comprises a comparator 401, two greatest coded line index extractors 402, 403, a data buffer 404, an encoding mode decision unit 405, and a multiplexer 406. One of the two greatest coded line index extractors will hereinafter be referred to as inter-mode GCLI extractor 402 for reasons of convenience. The other greatest coded line index extractor will hereinafter be referred to as intra-mode GCLI extractor 403.

The encoding mode selection module 105 basically operates as follows. The comparator 401 provides a differential representation of the sub-band frame portion to be encoded. The differential representation corresponds with a difference between the sub-band frame portion to be encoded and the corresponding previous sub-band frame portion, which has been retrieved from the frame buffer assembly. The multiplexer 406 receives the differential representation of the sub-band frame portion to be encoded on one input, and the sub-band frame portion itself on another input.

The encoding mode selection module 105 causes the encoding assembly 102 to encode the sub-band frame portion either in an intra mode or in an inter mode. In the intra mode, the multiplexer 406 passes the sub-band frame portion as present in the linearly transformed frame to the quantization module 106 illustrated in FIG. 1. Accordingly, in the intra mode, the sub-band frame portion as present in the linearly transformed frame is encoded, which involves data compression by the quantization module 106 and the entropy coding module 107. In the inter mode, the multiplexer 406 passes the differential representation of the sub-band frame portion to the quantizer. Accordingly, in the inter mode, the differential representation of the sub-band frame portion is encoded, which equally involves data compression by the quantization module 106 and the entropy coding module 107.

A main difference with conventional encoding schemes is that, in the inter mode, the differential representation of at least a portion of the linearly transformed frame is processed rather than a differential representation of a frame, or a portion thereof, in its original form. Accordingly, an encoding scheme in accordance with the present disclosure does not require applying an inverse linear transform to at least a portion of a linearly transformed frame, whereas applying the inverse linear transform is required in conventional encoding schemes. Thus, an encoding scheme in accordance with the present disclosure allows implementations of lower complexity in terms of hardware or software, or both, which, in turn, allows low cost and low power consumption implementations.

The fact that a difference between transformed frames is encoded rather than a difference between original frames does, in principle, not adversely affect image quality. This is because the reversible color transform and the wavelet transform mentioned hereinbefore are each linear. This implies that a subtraction operation subsequent to these transforms is equivalent to a subtraction operation prior to these transforms. Applying an inverse of these transforms to a differential representation obtained by the subtraction operation subsequent to these transforms, will yield a differential representation obtained by the subtraction prior to these transforms. Conversely, applying the transforms concerned to the differential representation obtained by the subtraction operation prior to these transforms, will yield the differential representation obtained by the subtraction operation subsequent to these transforms.

The encoding mode selection module 105 decides to encode a sub-band frame portion in the intra mode or in the inter mode in the following manner. The inter-mode GCLI extractor 402 provides a set of eight GCLI values pertaining to eight groups of four samples comprised in the differential representation of the sub-band frame portion. These GCLI values will hereinafter be referred to as inter-mode GCLI values for the sake of convenience. The intra-mode GCLI extractor 403 also provides a set of eight GCLI values pertaining to eight groups of four samples comprised in the sub-band frame portion to be encoded. These GCLI values will hereinafter be referred to as intra-mode GCLI values for the sake of convenience. The inter-mode GCLI extractor 402 and the intra-mode GCLI extractor 403 may each operate in a manner that is described in U.S. Pat. No. 9,332,258. This operation, which consists in GCLI extraction, will briefly be summarized in the following.

Figures 5, 7:
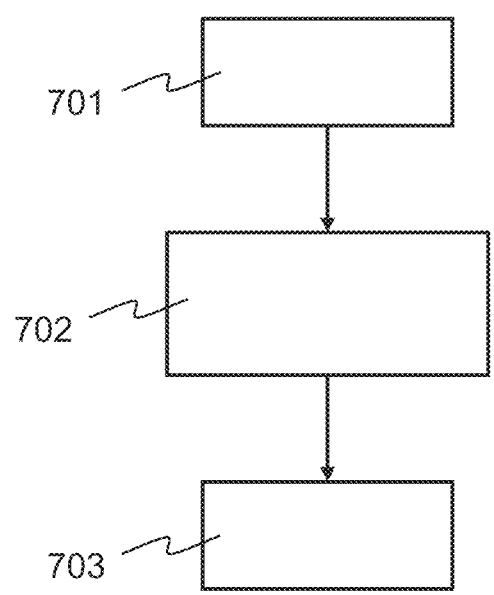
FIG. 5 is a conceptual diagram of an extraction of a GCLI value from a group of four samples in the encoding mode selection module.
FIG. 7 is a block diagram of a reference frame buffer assembly in the video encoder.

FIG. 5 schematically illustrates extraction of a GCLI value from a group of four samples 501-504. FIG. 5 provides a conceptual diagram of this extraction in which the four samples 501-504, which are in the form of binary words, are represented. In this example, the binary words each comprise a hierarchical plurality of bits that define a value. The binary words may further each comprise a sign bit, which is not represented in FIG. 5 for the sake of simplicity.

In the hierarchical plurality of bits, each bit has a particular hierarchical rank, indicated by M, . . . 5, 4, 3, 2, 1. M is an integer value corresponding with the number of bits comprised in the hierarchical plurality of bits. The bit that has the highest hierarchical rank M is usually referred to as most significant bit. The bit that has the lowest hierarchical rank 1 is usually referred to as least significant bit.

In the group of four samples, bits that have the same hierarchical rank constitute a so-called bit plane. Thus, the group of four samples comprises as many bit planes as there are bits in the hierarchical plurality of bits. Each bit plane has a hierarchical rank corresponding to that of the bits comprised in the bit plane. The most significant bits constitute a most significant bit plane, which is the highest hierarchical rank M, whereas the least significant bits constitute a least significant bit plane, which is the lowest hierarchical rank 1.

The extraction of a GCLI value consists in determining which bit plane comprises at least one nonzero bit starting from the most significant bit plane and going towards the least significant bit plane. The GCLI value indicates the hierarchical rank of this bit plane. The GCLI value may correspond with, for example, an integer value that expresses the hierarchical rank whereby the integer value 1 indicates that least significant bit plane and the integer value M indicates the most significant bit plane.

In the example illustrated in FIG. 5, the bit planes from M to 5 each comprise zero bits only. Such bit planes, which comprise zero bits only, will hereinafter be referred to as zero-bit planes for reasons of convenience. In the example illustrated in FIG. 5, bit plane 4 is the highest ranked bit plane that comprises at least one nonzero bit. In this example, the GCLI value may thus be 4.

The buffer temporarily stores the eight GCLI values that the inter-mode GCLI extractor 402 provides on the basis of the differential representation of the sub-band frame portion to be encoded. The buffer also temporarily stores the eight GCLI values that the intra-mode GCLI extractor provides on the basis of the sub-band frame portion to be encoded.

The encoding mode decision unit 405 calculates a sum of the eight GCLI values that the inter-mode GCLI extractor 402 has provided. This sum will hereinafter be referred to as inter-mode GCLI sum value. The encoding mode decision unit 405 also calculates a sum of the eight GCLI values that the intra-mode GCLI extractor 403 has provided. This sum will hereinafter be referred to as intra-mode GCLI sum value.

The intra-mode GCLI sum value indicates a data compression factor that can be achieved when the sub-band frame portion is encoded in the intra mode. The inter-mode GCLI sum value indicates a data compression factor that can be achieved when the sub-band frame portion is encoded in the inter mode. In fact, the aforementioned GCLI sum values each represent an estimation of the data compression factor.

The encoding mode selection module 105 encodes the sub-band frame portion in an intra mode in case the intra-mode GCLI sum value is smaller than, or equal to, the inter-mode GCLI sum value. To that end, the encoding mode decision unit 405 controls the multiplexer 406 so that the multiplexer 406 passes the sub-band frame portion to be encoded to an output of the encoding mode selection module 105. Accordingly, in the intra mode, the sub-band frame portion is further processed by the quantization module 106, the entropy coding module 107, and the data packaging module 108.

The encoding mode selection module 105 may encode the sub-band frame portion in the intra mode or an inter mode in case the inter-mode GCLI sum value is smaller than the intra-mode GCLI sum value. The intra mode is selected in case the encoding mode decision unit 405 determines that a predefined number K of corresponding previous sub-band frame portions have all been encoded in the inter mode, K representing an integer value. In that case, the sub-band frame portion is forcibly encoded in the intra mode, while it would otherwise be encoded in the inter mode. By doing so, the encoding mode decision unit 405 ensures that at least one sub-band frame portion in a sequence of K+1 corresponding sub-band frame portions is encoded in the intra mode. Thus, 1 over K+1 may be regarded as representing a minimum frequency with which corresponding sub-band frame portions are encoded in the intra mode.

The encoding mode selection module 105 encodes the sub-band frame portion in the inter mode in case the inter-mode GCLI sum value is smaller than the intra-mode GCLI sum value and less than K corresponding previous sub-band frames have been encoded in the inter mode. In that case, the encoding mode decision unit 405 controls the multiplexer 406 so that the multiplexer 406 passes the differential representation of the sub-band frame portion to be encoded to an output of the encoding mode selection module 105. Accordingly, in the inter mode, the differential representation is further processed by the quantization module 106, the entropy coding module 107, and the data packaging module 108.

The encoding mode selection module 105 thus evaluates whether the data compression factor indicated by the inter-mode GCLI sum value is higher than that indicated by the intra-mode GCLI sum value, or not. In case the aforementioned condition applies, the sub-band frame portion is, in principle, encoded in the inter mode. The encoding mode selection module 105 may nonetheless decide to forcibly encode the sub-band frame portion in the intra mode in order to ensure a predefined minimum frequency with which encoding in the intra mode is applied. In case the aforementioned condition does not apply, the sub-band frame portion is encoded in the intra mode.

The encoding mode selection module 105 thus provides several types of output data for a sub-band frame portion to be encoded. The encoding mode selection module 105 provides sub-band frame data to be compressed. The sub-band frame data is either the sub-band frame portion as present in the linearly transformed frame, or the differential representation of the sub-band frame portion, depending on whether the intra mode or the inter mode has been selected, respectively. In addition, the encoding mode selection module 105 provides an encoding mode flag, which indicates whether the sub-band frame portion is encoded in the intra mode according the inter mode. The encoding mode selection module 105 further provides GCLI coding values, which are either the intra-mode GCLI values, or the inter-mode GCLI values described hereinbefore, depending on whether the sub-band frame portion is encoded in the intra mode or in the inter mode, respectively.

Figure 6:
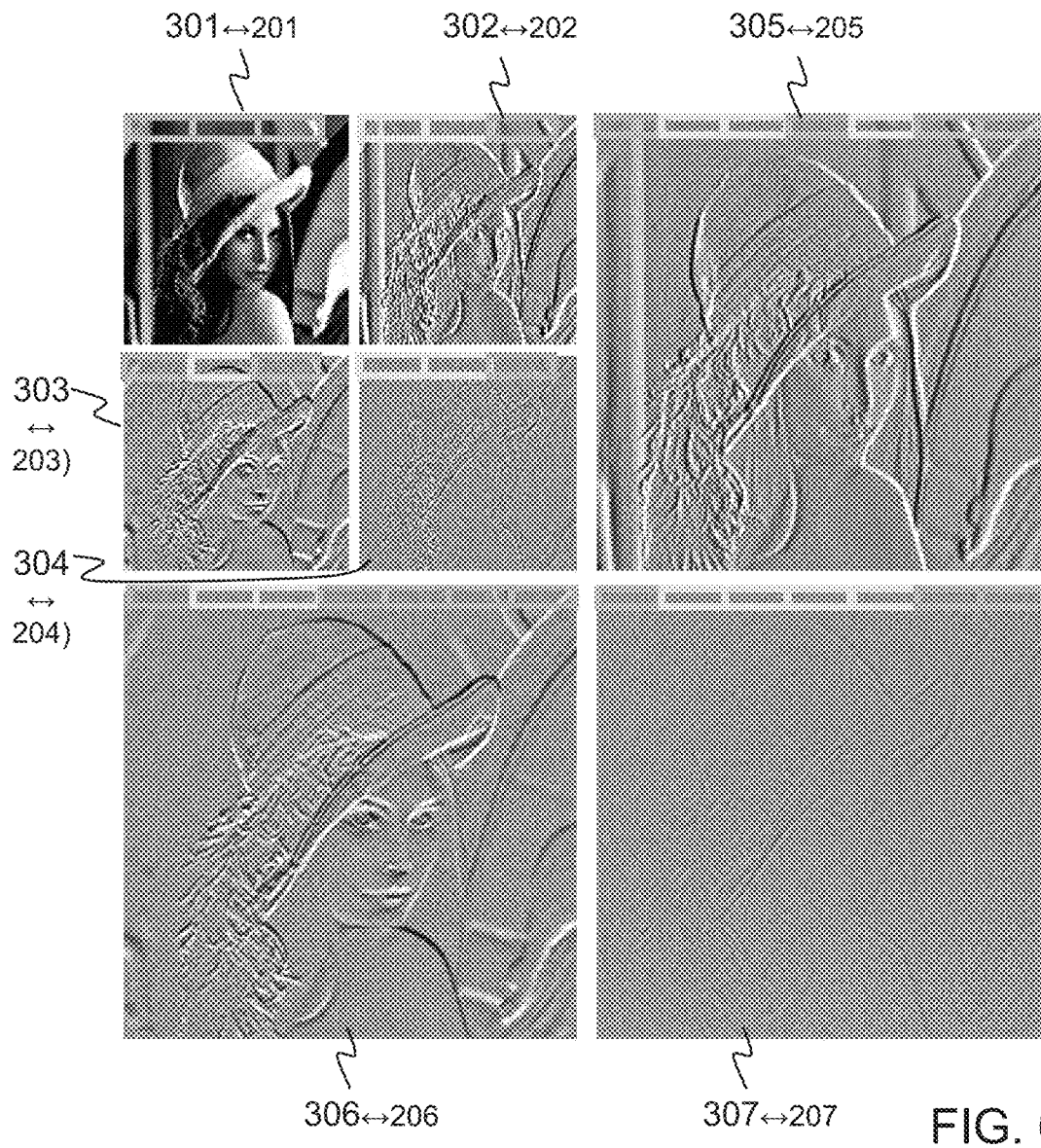
FIG. 6 is a pictorial diagram of the linearly transformed frame indicating portions that are encoded in an intra mode and other portions that are encoded in an inter mode.

FIG. 6 schematically illustrates the same linearly transformed frame as that illustrated in FIG. 3, wherein sub-band frame portions are indicated that are encoded in an intra mode, as well as other sub-band frame portions that are encoded in the inter mode. Sub-band frame portions that are encoded in the intra mode are indicated by means of relatively dark-toned rectangles. Sub-band frame portions that are encoded in the inter mode are indicated by means of relatively light-toned rectangles.

FIG. 6 clearly illustrates that the sub-band frames are encoded independently. For example, a first sub-band frame portion in the lowest sub-band frame 301 may be encoded in the inter mode, whereas a first sub-band frame portion in another low frequency sub-band frame 302, 303, 304, may be encoded the intra mode.

As mentioned hereinbefore, the encoding mode decision unit 405 ensures that, in a sequence of linearly transformed frames, corresponding sub-band frame portions are periodically encoded in the intra mode. This can be regarded as a refresh mechanism, which allows quickly achieving relatively good image quality at a decoding end. A video decoder can quickly lock in, as it were, on the encoded video stream 114 that the video encoder 100 illustrated in FIG. 1 provides. What is more, this also allows more robust video transmission. In case a portion of the encoded video stream 114 gets lost due, for example, transmission errors, an impacted zone of a frame can relatively quickly be restored.

In a sequence of corresponding sub-band frames, which all relate to the same sub-band, a portion of a sub-band frame that is forcibly encoded in the intra mode may differ in position with respect to that of a portion in a preceding sub-band frame that has forcible encoded in the intra mode. For example, referring to FIG. 6, let it be assumed that the first sub-band frame portion in the lowest sub-band frame 301 has forcibly been encoded in the intra mode. In that case, in a subsequent lowest sub-band frame, a second sub-band frame portion, which is positioned after the first sub-band frame portion, may be forcibly encoded in the intra mode. In a further subsequent lowest sub-band frame, a third sub-band frame portion, which is positioned after the second sub-band frame portion, may be forcibly encoded in the intra mode, and so on. This can be regarded as a shifting, or de-phasing scheme, according to which sub-band frames portions are periodically encoded in the intra mode. Such a scheme contributes to efficient rate allocation, as well as to a video decoder quickly locking in on the encoded video stream 114.

A minimum frequency with which sub-band frame portions are forcibly encoded in the intra mode may depend on the sub-band frame to which these sub-band frame portions belong. Referring to FIGS. 3 and 6, the minimum frequency may be higher for the low-frequency sub-band frames 301-304 than that for the high-frequency sub-band frames 305-307. That is, the aforementioned number K+1, representing the inverse of the minimum frequency, may be higher for the high-frequency sub-band frames 305-307 than for the low-frequency sub-band frames 301-304. This allows quickly obtaining a low-resolution video representation of acceptable quality at a decoding end, and a high-resolution video representation a little bit later, without significantly compromising compression effectiveness. For example, in an embodiment, the low-resolution representation may be obtained after 4 frames, whereas the high-resolution representation may be obtained after 32 frames.

Referring again to FIG. 1, the quantization module 106 quantizes the sub-band frame data that the encoding mode selection module 105 provides. Accordingly, the quantization module 106 provides quantized sub-band frame data. The quantization module 106 applies a quantization factor in quantizing the sub-band frame data. In case the quantization factor is relatively high, the sub-band frame data is coarsely quantized providing relatively high data compression. Conversely, in case the quantization factor is relatively low, the sub-band frame data is finely quantized providing relatively low data compression. The quantization factor may be controlled by the rate allocation module 109 so that the encoded video stream 114 has a desired data rate while optimizing image quality.

The entropy coding module 107 applies entropy coding operations to the quantized sub-band frame data. The entropy coding operations may comprise, for example, operations described in U.S. Pat. No. 9,332,258 already mentioned hereinbefore. In that case, the entropy coding module 107 receives GCLI coding values from the encoding mode selection module 105 described hereinbefore. The GCLI coding values indicate zero-bit planes in the quantized sub-band frame data. The entropy coding module 107 may then remove these zero-bit planes. In effect, the zero-bit planes are replaced by the GCLI coding values indicating where these bit planes lie in the sub-band frame data. The entropy coding module 107 may also apply entropy coding to the GCLI coding values so that these values are expressed with as little data as possible. U.S. Pat. No. 9,332,258 describes some entropy coding techniques that may be used to that effect.

In addition to removing zero-bit planes, the entropy coding module 107 may also truncate samples in the quantized sub-band frame data. Such truncation may involve removing one or more least significant bit planes. This is also described in U.S. Pat. No. 9,332,258. The rate allocation module 109 may control the truncation, deciding if one or more least significant bit planes should be removed and, if so, how many. The rate allocation module 109 may control the truncation in order to achieve that the encoded video stream 114 has the desired data rate while optimizing image quality.

The data packaging module 108 packages several types of data into the encoded video stream 114. This includes the entropy coded sub-band frame data that the entropy coding module 107 provides. This may further include, for example, entropy coded GCLI values, as well as encoding mode flags and quantization factors that the quantization module 106 has applied.

The rate allocation module 109 may control the quantization module 106 and the entropy coding module 107 on the basis of GCLI coding values that the encoding mode selection module 105 provides. The GCLI coding values provide an estimation of a data compression factor that can be achieved by removing zero-bit planes only. The rate allocation module 109 may compare this data compression factor with a desired data compression factor, which expresses the desired data rate of the encoded video stream 114, If, for example, there is a relatively large gap between the aforementioned data compression factors, the rate allocation module 109 may decide that a relatively high quantization factor should be applied, or that a relatively severe truncation should be applied, or both.

As mentioned hereinbefore, the reference frame buffer assembly 112 may comprise a representation of a previous linearly transformed frame that has already been encoded. This representation constitutes a reference for inter-mode encoding sub-band frame portions of a linearly transformed frame that is currently to be encoded. The representation of the previous linearly transformed frame may be obtained as follows.

The de-quantization module 110 applies an inverse quantization to the quantized sub-band frame data that the quantization module 106 provides. Accordingly, the de-quantization module 110 provides de-quantized sub-band frame data, which may be regarded as a coarser representation of the sub-band frame data that the encoding mode selection module 105 has produced. In case of intra-mode encoding, the de-quantized sub-band frame data is a coarser representation of the sub-band frame portion as present in the linearly transformed frame. In case of inter-mode encoding, the de-quantized sub-band frame data is a coarser representation of the differential representation of the sub-band frame portion.

The reconstruction module 111 processes the de-quantized sub-band frame data in the case of inter-mode encoding. The reconstruction module 111 retrieves the corresponding previous sub-band frame portion mentioned hereinbefore from the reference frame buffer assembly 112. Namely, the corresponding previous sub-band frame portion has been used to produce the differential representation of the sub-band frame portion on the basis of which the de-quantized sub-band frame data has been produced. The reconstruction module 111 then adds the corresponding previous sub-band frame portion to the de-quantized sub-band frame data. Accordingly, a reconstructed version of the sub-band frame portion that has currently been encoded is obtained. The reconstruction module 111 applies the reconstructed version of the sub-band frame portion to the reference frame buffer assembly 112.

The reconstruction module 111 directly passes the de-quantized sub-band frame data to the reference frame buffer assembly 112 in the case of intra-mode encoding. Namely, in that case, the de-quantized sub-band frame data constitutes a reconstruction version of the sub-band frame portion.

Thus, in an encoding process, the reference frame buffer assembly 112 successively receives reconstructed sub-band frame portions that may jointly form a reconstructed sub-band frame. More generally, the reference frame buffer assembly 112 successively receives reconstructed sub-band frames that jointly form a reconstructed version of the linear transformed frame. Ideally, the reconstructed version of the linear transformed frame corresponds with a decoded version of the linear transformed frame in a video decoder of which an embodiment will be presented hereinafter. That is, in general terms, a reference for encoding data should ideally correspond with a reference used for decoding that same data. Thus, if a reference used for decoding data consists of previously decoded data, the reference used for encoding that data should be a decoded version of previously encoded data, rather than the data in its original form.

FIG. 7 schematically illustrates the reference frame buffer assembly 112. FIG. 7 provides a block diagram of the reference frame buffer assembly 112. The reference frame buffer assembly 112 comprises a basic entropy encoder 701, a buffer memory 702, and a basic entropy decoder 703.

The reference frame buffer assembly 112 basically operates as follows. The basic entropy encoder 701 applies GCLI extraction to the reconstructed version of the sub-band frame portion. This GCLI extraction may be similar to that described hereinbefore with reference to FIG. 5. The basic entropy encoder 701 removes zero-bit planes in respective groups of samples. The basic entropy encoder 701 may further truncate samples by removing one or more least significant bit planes. Accordingly, reduced samples are obtained, which may lack one or more most significant bits that are zero, and which may lack one or more least significant bits that have been truncated.

The basic entropy encoder 701 produces a compressed reconstructed version of the sub-band frame portion, which includes the reduced samples. The compressed reconstructed version may further include GCLI values that have been obtained by the GCLI extraction, described hereinbefore with reference to FIGS. 4 and 5. The compressed reconstructed version may comprise the GCLI values in an entropy encoded form.

The buffer memory 702 stores the compressed reconstructed version of the sub-band frame portion. Accordingly, in the encoding process, the buffer memory 702 successively stores compressed reconstructed sub-band frame portions that may jointly form a compressed reconstructed sub-band frame. More generally, the reference frame buffer assembly 112 successively stores compressed reconstructed sub-band frames that jointly form a compressed reconstructed version of the linear transformed frame.

The basic entropy decoder 703 decompresses a compressed reconstructed sub-band frame portion, which may be required for inter-mode encoding a corresponding subsequent sub-band frame portion. In this manner, the aforementioned representation of the corresponding previous sub-band frame portion is obtained.

The video encoder 100 illustrated in FIG. 1 thus applies frame buffer compression. Accordingly, a relatively small amount of memory is sufficient to store sub-band frames and, more generally, linear transformed frames that are required for encoding in the inter mode. Moreover, frame buffer compression relaxes bandwidth requirements related to transfers of data to the buffer memory 702 and from the buffer memory 702, which concern reconstructed sub-band frame portions, This may be a significant advantage in embodiments where the buffer memory 702 is in the form of an external memory circuit, whereas other entities of the video encoder 100 are incorporated in a signal processing circuit. In such embodiments, as well as in other embodiments, relaxed bandwidth requirements generally contribute to achieving relatively low power consumption.

However, frame buffer compression may affect image quality to a certain extent. This is because the representation of the corresponding previous sub-band frame portion that is available for inter-mode encoding is a coarser version of the corresponding previous sub-band frame portion itself. Nonetheless, in many embodiments it is possible to configure the frame buffer compression so that a loss in image quality is visually hardly noticeable, or event not visually noticeable at all. That is, the frame buffer compression may be visually lossless. Moreover, in principle, frame buffer compression does not affect a delay between a decoding start and reaching a satisfactory image quality.

Figure 8:
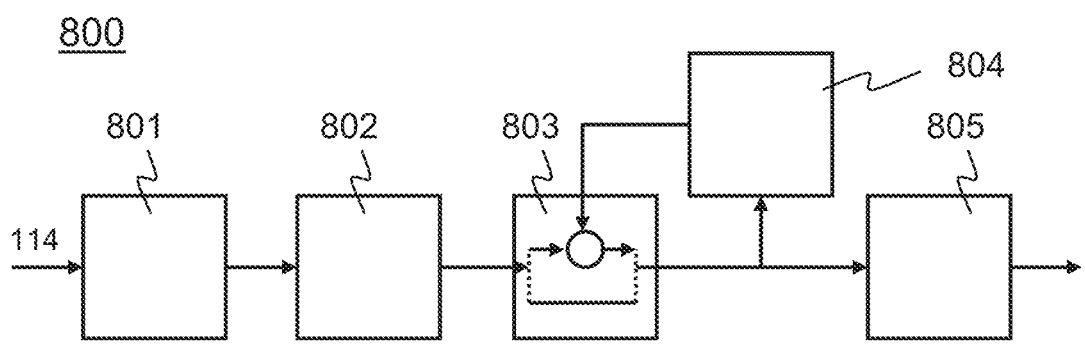
FIG. 8 is a block diagram of a video decoder.

FIG. 8 schematically illustrates a video decoder, which is represented by a block diagram. The video decoder may receive and decode the encoded video stream 114 produced by the video encoder 100 described hereinbefore with reference to FIGS. 1-7. The video decoder comprises an unpacking module 801, an entropy decoding and de-quantization module 802, a decoding reconstruction module 803, a decoding buffer memory 804, an inverse wavelet and color transform module 805.

The video decoder basically operates as follows. The unpacking module 801 carries out operations inverse to those carried out by the packing module described hereinbefore. Accordingly, the unpacking module 801 retrieves various types of data from the encoded video stream 114, such as entropy coded sub-band frame data; entropy coded GCLI values, as well as encoding mode flags.

The entropy decoding and de-quantization module 802 carries out operations inverse to those carried out by the entropy coding module 107 described hereinbefore. For example, the entropy decoding and de-quantization module 802 may retrieve GCLI coding values from the entropy coded GCLI values. The entropy decoding and de-quantization module 802 may then restore removed zero-bit planes on the basis of these GCLI coding values. The entropy decoding and de-quantization module 802 may further add dummy bits to replace least significant bits that have been removed as a result of truncation. Accordingly, quantized sub-band frame data is re-created, which then undergoes a de-quantization operation. The de-quantization operation is based on quantization factors that have been packed into the encoded video stream 114. Accordingly, the entropy decoding and de quantization module 106 provides decoded sub-band frame data.

The decoding reconstruction module 803 processes the decoded sub-band frame data on the basis of the encoding mode flags. In case an encoding mode flag indicates intra-mode encoding, the decoded sub-band frame data is a decoded version of a sub-band frame portion that can directly be used to reconstruct a linearly transformed frame without further processing. In that case, the decoding reconstruction module 803 applies the decoded version of the sub-band frame portion to the decoding buffer memory 804 for temporary storage. Furthermore, the decoded version of the sub-band frame portion is applied to the inverse wavelet and color transform module 805.

In case the encoding mode flag indicates inter-mode encoding, the decoded sub-band frame data is a decoded version of a differential representation of a sub-band frame portion. In that case, the decoding reconstruction module 803 retrieves a corresponding previous decoded sub-band frame portion from the decoding buffer memory 804. The decoding reconstruction module 803 then adds the corresponding previous decoded sub-band frame portion to the decoded version of the differential representation of the sub-band frame portion. Accordingly, a decoded version of the sub-band frame portion is obtained, which is then applied to the decoding buffer memory 804 and the inverse wavelet and color transform module 805.

Thus, in contrast with conventional video decoders, the decoding buffer memory 804 temporarily stores sub-band frames that are part of a linearly transformed frame, rather than a fully decoded frame, which is in a spatial domain. That is, in the video decoder 800 illustrated in FIG. 8, a linearly transformed frame serves as a reference for inter-mode decoding rather than a fully decoded frame.

The inverse wavelet and color transform module 805 applies an inverse of the wavelet transform and an inverse of the reversible color transform to the decoded version of the sub-band frame portion. That is, an inverse linear transform is applied to the decoded version of the sub-band frame portion. By applying the inverse linear transform to successive decoded versions of sub-band frame portions, the inverse linear transform is applied to decoded versions of sub-band frames that constitute a decoded version of linearly transformed frame. A decoded version of a frame that was encoded by the video encoder 100 illustrated in FIG. 1 is then obtained.

The embodiments described hereinbefore with reference to the drawings are presented by way of illustration. The invention may be implemented in numerous different ways. In order to illustrate this, some alternatives are briefly indicated.

The invention may be applied in numerous types of products or methods related to video compression, or video decompression, or both. For example, the invention may be applied in a multifunctional integrated circuit that is capable of carrying out at least one other function than video compression.

There are numerous different ways of implementing a video encoder and a video decoder in accordance with the invention. Any of the modules in the presented embodiments may be implemented by means of an electrical circuit, which may be dedicated or programmable, or by means of a suitably programmed processor, or a combination thereof. A computer program may define one or more operations carried out by the video encoder, which have been described with reference to FIGS. 1-7. Similarly, a computer program may define one or more operations carried out by the video decoder, which have been described with reference to FIG. 8. In this respect, the block diagrams of FIGS. 1, 4, 7 and 8 may each also be regarded, at least partially, as representing a flow chart diagram of such a computer program, as well as representing a method that a processor may carry out when executing the computer program. For example, the reversible color transform module illustrated in FIG. 1 may be regarded as representing a color transform step. Similarly, other modules may be regarded as representing steps of a method.

There are numerous different ways of implementing a linear transform in a product or method accordance with the invention. In the presented embodiments, the linear transform comprises a reversible color transform. In other embodiments, this transform may be dispensed with. In the presented embodiments, the linear transform comprises a wavelet transform. In other embodiments, the linear transform may be, for example, a discrete cosine-based transform.

There are numerous different ways of implementing an encoding that compresses data in a product or method accordance with the invention. In the presented embodiments, such encoding involves GCLI extraction, zero-bit plane removal, and truncation. In other embodiments, other entropy encoding schemes may be used.

There are numerous different ways of implementing a reference frame buffer assembly in a product or method in accordance with the invention. In the presented embodiments, the reference frame buffer assembly applies frame buffer compression. In other embodiments, frame buffer compression may be dispensed with so that the reference frame buffer assembly need not comprise a data-compressing encoder and a data-compressing decoder.

There are numerous different ways of providing a representation of a corresponding portion of another linearly transformed frame for the purpose of inter-mode encoding. In the presented embodiments, the corresponding portion is the portion that has the same position in the previous linearly transformed frame. That is, no motion estimation or motion compensation is used. In other embodiments, motion estimation may be used to identify a corresponding portion. Moreover, a corresponding portion that is used for the purpose of inter-mode encoding need not necessarily be based on a single previous linearly transformed frame. For example, the corresponding portion may be based on a combination of portions in two or more previous linearly transformed frames.

In general, there are numerous different ways of implementing the invention, whereby different implementations may have different topologies. In any given topology, a single entity may carry out several functions, or several entities may jointly carry out a single function. In this respect, the drawings are very diagrammatic.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. An encoder adapted to encode a sequence of frames, the encoder comprising:
   a linear transform assembly adapted to apply a linear transform to the sequences of frames on a frame-by-frame basis so as to obtain a sequence of linearly transformed frames having an entropy that is lower than that of the frames in the sequence of frames to be encoded, and
   an encoding assembly adapted to encode the sequence of linearly transformed frames so as to obtain a sequence of encoded frames comprising an amount of data that is less than that of the linearly transformed frames,
   wherein the encoding assembly is adapted to encode at least one portion of a linearly transformed frame in an inter mode and to encode at least one other portion of the same linearly transformed frame in an intra mode, so as to obtain an encoded frame, the at least one portion and the at least one other portion having different spatial positions within the same linearly transformed frame,
   whereby, in the inter mode, the encoding assembly provides a differential representation of a portion of the linearly transformed frame, the differential representation corresponding with a difference between, on the one hand, the portion of the linearly transformed frame and, on the other hand, a representation of a corresponding portion of at least one other linearly transformed frame, and in which the encoding assembly applies data compression to the differential representation of the portion of the linearly transformed frame, and
   whereby, in the intra mode, the encoding assembly directly applies the data compression to another portion of the same linearly transformed frame.

2. An encoder according to claim 1, wherein the encoding assembly is adapted to evaluate for a portion of a linearly transformed frame whether the following condition applies, or not: when the portion of the linearly transformed frame is encoded in the inter mode, an encoded version of the portion of the linearly transformed frame is obtained that comprises a smaller amount of data than an encoded version that is obtained by encoding the portion of the linearly transformed frame in the intra mode, and wherein the encoding assembly is adapted to encode the portion of the linearly transformed frame in the inter mode if the condition applies and to encode the portion of the linearly transformed frame in the intra mode if the condition does not apply.

3. An encoder according to claim 1, wherein the encoding assembly is adapted to obtain the representation of the corresponding portion of the at least one other linearly transformed frame by applying an inverse of the data compression to a corresponding portion of at least one encoded frame that has been obtained by encoding the corresponding portion of the at least one other linearly transformed frame.

4. An encoder according to claim 1, wherein the encoding assembly is adapted to periodically encode respective linearly transformed frame portions in the intra mode.

5. An encoder according to claim 4, wherein the encoding assembly is adapted to periodically encode in the intra mode respective linearly transformed frame portions having a similar spatial position in respective linearly transformed frames with a minimum frequency and periodically encode in the intra mode respective linearly transformed frame portions having another similar spatial position in the respective linearly transformed frames with the same minimum frequency but de-phased with respect to intra mode encoding of the first-mentioned respective linearly transformed frame portions.

6. An encoder according to any of claim 4, wherein the encoding assembly is adapted to periodically encode in the intra mode respective linearly transformed frame portions belonging to a group of linearly transformed frame portions with a minimum frequency, and to periodically encode in the intra mode respective linearly transformed frame portions belonging to another group of linearly transformed frame portions with a different minimum frequency.

7. An encoder according to claim 6, wherein the linear transform assembly is adapted to define respective sub-bands, whereby the one and the other group of linearly transformed frame portions are associated with different sub-bands.

8. An encoder according to claim 1, wherein the data compression that the encoding assembly applies comprises a greatest coded line index coding operation.

9. An encoder according to claim 1, wherein the data-compression that the encoding assembly applies comprises a quantization operation.

10. An encoder according to claim 1, wherein the encoding assembly is adapted to decode an encoded frame so as to obtain a decoded linearly transformed frame, wherein the encoding assembly is adapted to apply data-storage compression to the decoded linearly transformed frame so as to obtain a compressed version of the decoded linearly transformed frame, wherein the encoding assembly is adapted to store the compressed version of the decoded linearly transformed frame in a frame buffer memory, and wherein the encoding assembly is adapted to apply an inverse of the data-storage compression to the compressed version of the decoded linearly transformed frame so as to obtain a decompressed version of the decoded linearly transformed frame from which a representation of at least one portion of a linearly transformed frame is obtained that is used for providing a differential representation of at least corresponding version of a linearly transformed frame to be encoded in the inter mode.

11. An encoder according to claim 10, wherein the data-storage compression that the encoding assembly applies to the decoded linearly transformed frame comprises a greatest coded line index coding operation.

12. A method of encoding a sequence of frames, the method comprising:
   a linear transform step in which a linear transform is applied to the sequences of frames on a frame-by-frame basis so as to obtain a sequence of linearly transformed frames having an entropy that is lower than that of the frames in the sequence of frames to be encoded, and an encoding step in which the sequence of linearly transformed frames is encoded so as to obtain a sequence of encoded frames comprising an amount of data that is less than that of the linearly transformed frames, wherein, in the encoding step, at least one portion of a linearly transformed frame is encoded in an inter mode whereas at least one other portion of the same linearly transformed frame is encoded in an inter mode, so as to obtain an encoded frame, the at least one portion and the at least one other portion having different spatial positions within the same linearly transformed frame, whereby, in the inter mode, a differential representation of a portion of the linearly transformed frame is provided, the differential representation corresponding with a difference between, on the one hand, the portion of the linearly transformed frame and, on the other hand, a representation of a corresponding portion of at least one other linearly transformed frame, and in which data compression is applied to the differential representation of the portion of the linearly transformed frame, and whereby, in the intra mode, the data compression is directly applied to another portion of the same linearly transformed frame.

13. A decoder adapted to decode the sequence of encoded frames provided by an encoder according to claim 1, the decoder being adapted to decode at least one portion of an encoded frame in the inter mode so as to obtain at least one decoded portion of a linearly transformed frame and to decode at least one other portion of the same encoded frame in the intra mode so as to obtain at least one decoded other portion of the same linearly transformed frame.

\* \* \* \* \*